No. 762,243.

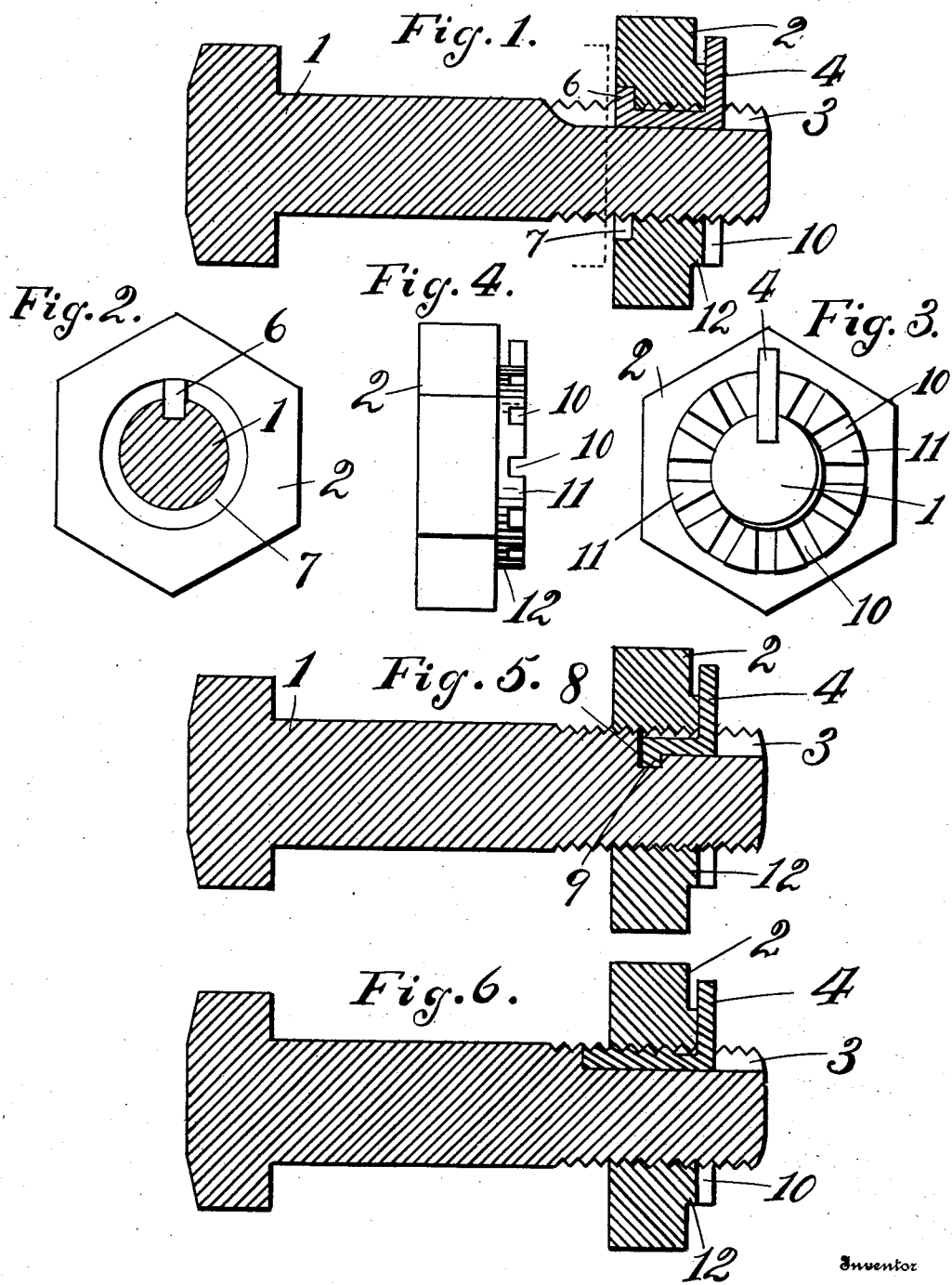

Patented June 7, 1904.

UNITED STATES PATENT OFFICE.

WILLIAM L. MORROW, OF STOCKTON, CALIFORNIA.

NUT-LOCK.

SPECIFICATION forming part of Letters Patent No. 762,243, dated June 7, 1904.

Application filed November 13, 1903. Serial No. 181,088. (No model.)

*To all whom it may concern:*

Be it known that I, WILLIAM LAFAYETTE MORROW, a citizen of the United States, residing at Stockton, in the county of San Joaquin and State of California, have invented certain new and useful Improvements in Nut-Locks, of which the following is a specification.

My invention relates to improvements in nut-locks, the object of my invention being to provide a device of this character which can be manufactured at a cost very slightly exceeding that of an ordinary nut unprovided with a lock, which shall be thoroughly effective in preventing the unscrewing of the nut from the bolt, and which can be operated both to lock and unlock the nut very easily and rapidly.

In the accompanying drawings, Figure 1 is a longitudinal section of a bolt and nut constructed in accordance with my invention. Fig. 2 is a view of the inner side of the nut. Fig. 3 is a view of the outer side of the same. Fig. 4 is a side view of the nut. Fig. 5 is a view similar to Fig. 1 of a modified form of the invention. Fig. 6 is a similar view of a further modification.

Referring to the drawings, 1 represents a bolt, and 2 the nut thereon. The bolt has in its threaded portion a longitudinal groove 3, in which is a soft-metal key 4. Said key is held from longitudinal movement in said groove by suitable means. In the modification shown in Figs. 1 to 4 this is done by providing the key with a head 6, which enters an annular recess 7, formed in the front face of the nut. In the modification shown in Fig. 5 it is accomplished by forming the groove with a deeper portion or socket 8, and the key has a head 9, which lies in said socket. In the modification shown in Fig. 6 it is accomplished by forming the key with threads on its outer surface, which threads coincide with the threads of the bolt and entering the threads of the nut prevent longitudinal movement of the key. After the nut has been screwed into place it is prevented from turning in either direction by bending the key outward or radially and pressing it into one of the grooves 10 between a circular series of abutments 11 on the outer surface of the nut. The grooves 10 between these abutments have parallel sides and are of substantially the same width as the width of the key, so that the key when turned up fits the groove snugly and prevents movement of the nut.

It is very important to be able to unlock the nut as well as to lock it easily and rapidly. For this purpose I provide the following construction: The abutments 11 do not project directly from the outer face of the nut, but from a hub-like portion or circular shoulder 12 of the same diameter as the circular series of abutments. The width or extent of projection of this shoulder from this face of the nut is just sufficient to enable a suitable instrument to be inserted between the face of the nut and the rear or inner face of the key after the key has been turned up into one of the grooves 10. Without this circular shoulder after the key has been turned up and hammered into one of the grooves its inner face fits so closely against the outer face of the nut that considerable difficulty is experienced in wedging or forcing out the same when it is desired to unlock the nut. By providing the circular shoulder between the face of the nut and the abutments and forming the bottom of the grooves it results that however much the key is hammered against the bottom of one of said grooves there will be sufficient space between said key and the face of the nut to permit the insertion of a wedge-like instrument to force the key outward. I have found that with this construction the nut can be unlocked in a very small fraction, on an average, of the time required when the nut is not provided with this shoulder. The saving of time is thus very considerable.

I claim—

In a nut-lock, in combination with a bolt having a groove, a soft-metal key in said groove, and a nut, said bolt and nut being provided with means for preventing longitudinal movement of the key in the groove, and the nut having a circular series of abutments forming grooves therebetween into one of which the key is adapted to be turned up to prevent rotation of the nut, and said nut having a narrow circular shoulder or hub-like portion extending from the face of the nut and of substantially the same diameter as the series of abutments, and from which said abutments extend, whereby when said key is turned up, a space is left for insertion of a suitable instrument to press the key from the face of the nut, substantially as described.

In witness whereof I have hereunto set my hand in the presence of two subscribing witnesses.

WILLIAM L. MORROW.

Witnesses:
FRANCIS M. WRIGHT,
BESSIE GORFINKEL.